March 15, 1955  C. E. SOUTHWICK  2,703,928
TREE TRIMMING SAW MECHANISM
Filed Dec. 8, 1953  2 Sheets-Sheet 1
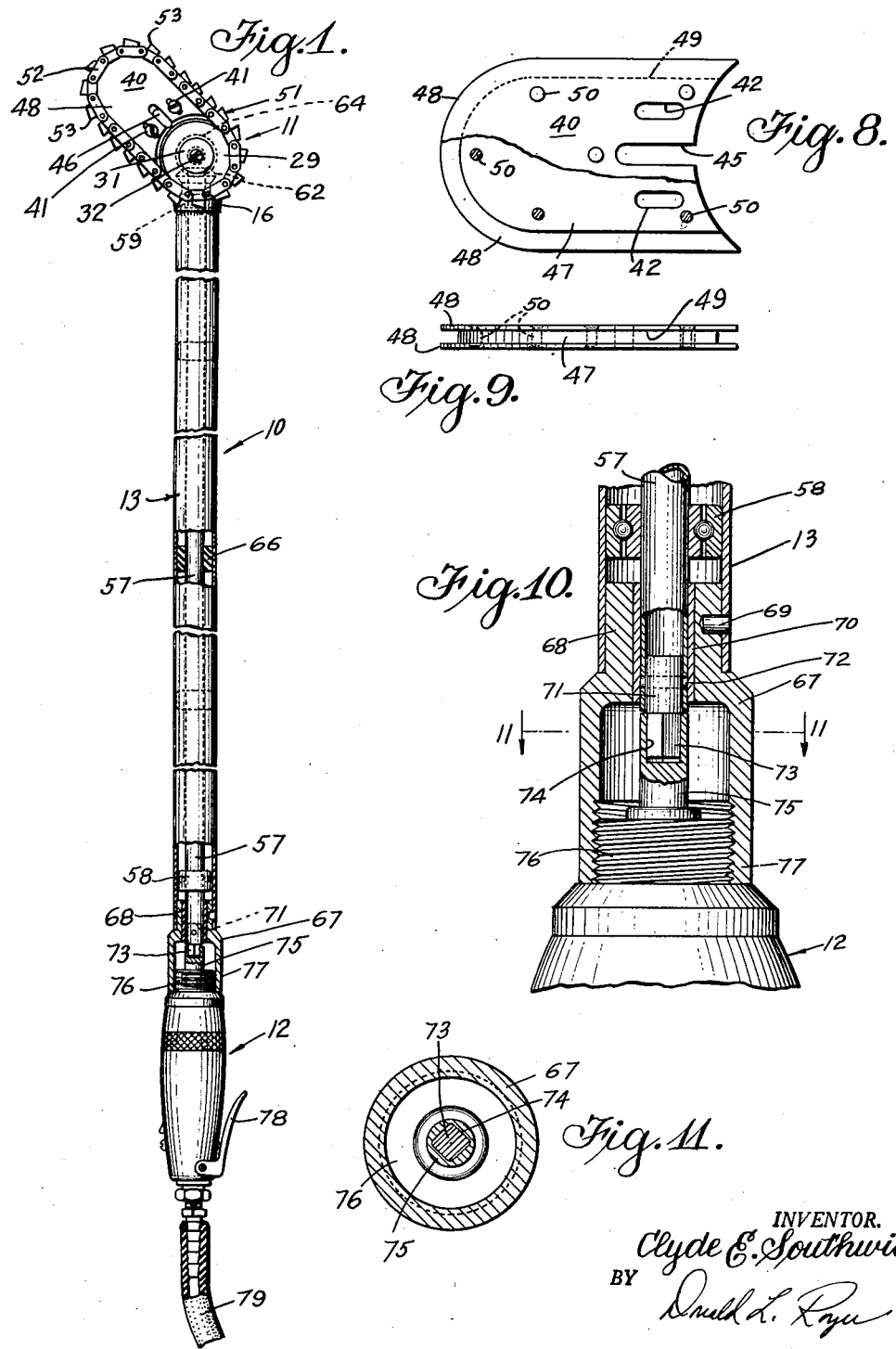
INVENTOR.
Clyde E. Southwick.
BY
AGENT.

March 15, 1955
C. E. SOUTHWICK
2,703,928
TREE TRIMMING SAW MECHANISM
Filed Dec. 8, 1953
2 Sheets-Sheet 2
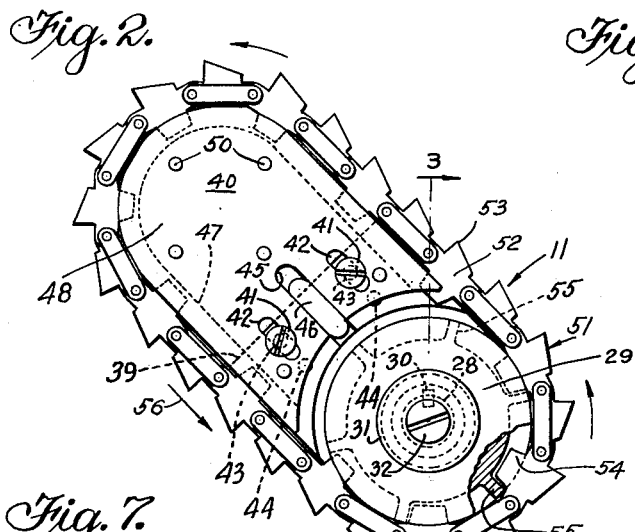
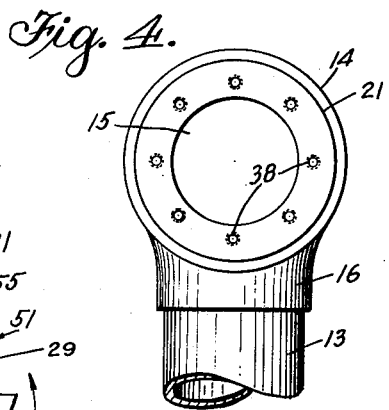
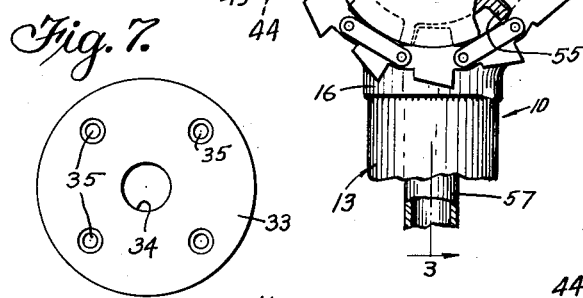
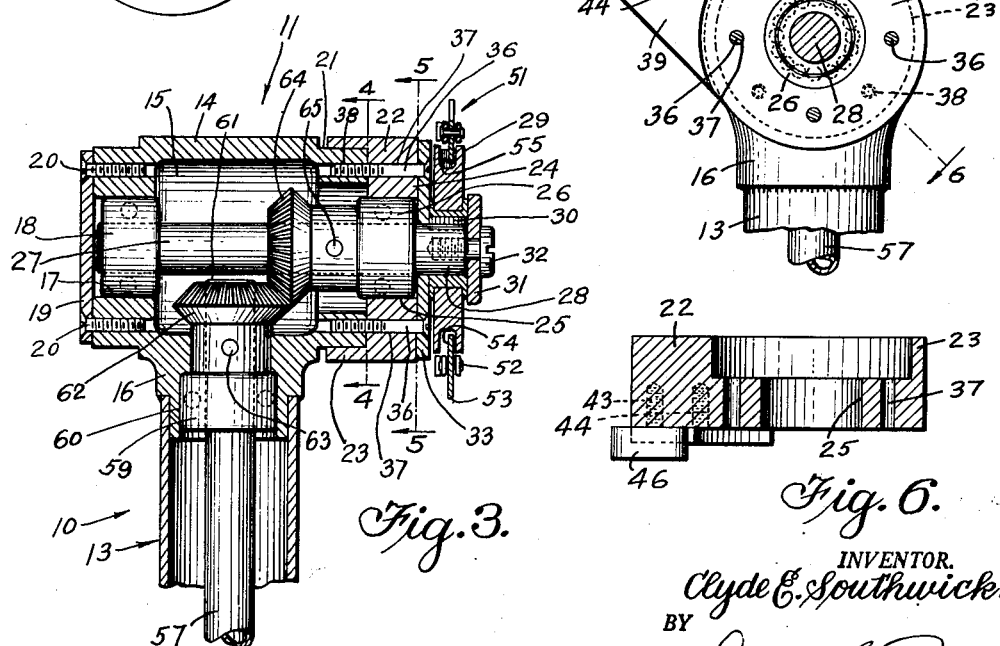
INVENTOR.
Clyde E. Southwick.
BY
Donald L. Ryan
AGENT.

United States Patent Office 2,703,928
Patented Mar. 15, 1955

2,703,928

TREE TRIMMING SAW MECHANISM

Clyde E. Southwick, Alhambra, Calif.

Application December 8, 1953, Serial No. 396,900

7 Claims. (Cl. 30—167)

The present invention relates generally to a tree trimming saw mechanism and relates more specifically to such a trimming saw mechanism employing an endless type chain saw or the like, said saw being supported in such a manner as to enable the reaching of low tree limbs for trimming or pruning thereof.

It is an important object of the present invention to provide a tree trimming or saw mechanism that is relatively simple in construction and accordingly light in weight, in order that the mechanism may be handled by a single individual for pruning or trimming trees or the like.

It is another important object of the present invention to provide a tree trimming saw mechanism incorporating an endless chain type saw having a novel support means therefor in order that said saw may be disposed in such a manner relative to a handle as to place the cutting portion of said saw in preferred relationship to tree limbs that are to be trimmed.

It is a further important object of the present invention to provide a trimming saw mechanism with novel means to support and drive an endless chain type saw in cooperation with novel means for adjustably positioning said saw relative to the driving means therefor.

It is a still further important object of the present invention to provide a tree trimming saw mechanism wherein novel means are employed for adjustably positioning an endless chain type saw about the axis of a driving shaft therefor.

It will be seen that the present invention has other objects, advantages and features, some of which, with the foregoing, to be set forth in the following description in which a certain embodiment of the invention has been selected for illustrative purposes only in the drawings, accompanying and forming a part of the present specification, and wherein:

Fig. 1 is a longitudinal view partially in section, showing the tree trimming saw mechanism, together with the driving means therefor;

Fig. 2 is an enlarged fragmentary view partially in section, showing the saw of the invention together with the mounting means and tension adjusting means therefor;

Fig. 3 is a transverse sectional view to the head of the present tree trimming saw mechanism as taken substantially as indicated by line 3—3, Fig. 2.

Fig. 4 is a side elevational view of the head of the present invention as taken substantially as indicated by line 4—4, Fig. 3;

Fig. 5 is a sectional view of a portion of the head mechanism together with a cap therefor, as taken substantially as indicated by line 5—5, Fig. 3;

Fig. 6 is a transverse sectional view of the cap member of the present invention as taken substantially as indicated by line 6—6, Fig. 5;

Fig. 7 is a front elevational view of a retainer plate utilized with the head of the present invention;

Fig. 8 is a side elevational view of an adjustably positioned guide member for the chain type saw of the present invention;

Fig. 9 is a bottom plan view of the guide member of Fig. 8;

Fig. 10 is an enlarged fragmentary sectional view showing the means for attaching the driving structure to an operative mechanism of the present invention; and Fig. 11 is a transverse sectional view to the driving mechanism of Fig. 10 and taken substantially as indicated by line 11—11, Fig. 10.

Referring to the drawings by reference characters, the tree trimming saw mechanism of the present invention is shown primarily in Figs. 1 and 2, as indicated generally at 10. As shown the mechanism includes an upper end saw containing portion indicated generally at 11 and a driving means 12, these general components being connected together as by a suitable elongated tubular handle member indicated generally at 13.

Referring now primarily to Figs. 1, 2 and 3 of the drawings, the head assembly 11 comprises a substantially cylindrical head 14, and internal chamber 15. A boss 16 depends from the lower portion of the head 14, the tubular handle member 13 being secured to the boss 16 as by any suitable manner as welding, for example. The head 14 has a bore 17 formed axially within one end thereof, this bore being adapted for the reception of a suitable ball bearing 18. The bore 17 and the bearing 18 may be covered as by a cover plate 19 that is secured to the head 14 as by suitable screws 20. The other end of the head 14 has a reduced diameter cylindrical portion 21 on which a cap member 22 is adapted to be disposed. The cap member 22 has an axially extending flange portion 23 that is adapted to be rotatably positioned about the reduced diameter cylindrical portion 21 of the head 14. The cap member 22 further has an end wall portion 24, in which an axial bore 25 is formed. A ball bearing 26 is adapted for reception in the bore 25.

A stub shaft 27 is disposed axially within the head 14 and rotatably supported by the bearings 18 and 26, this stub shaft extending outwardly beyond the head and the cap member 22, an end portion 28 thereof being adapted to support a shrouded sprocket 29, this sprocket being keyed to the portion 28 of the shaft 27 as by a key 30 and secured on the end of the shaft as by a washer 31 and screw 32, the screw 32 making threaded connection with the outer end of the portion 28 of the shaft 27.

A retainer plate 33 is disposed about the portion 28 of the shaft 27 and between the sprocket 29 and the outer surface of the cap 22. As shown primarily in Fig. 7, the retainer plate 33 has a central bore 34 that is adapted to be disposed about the shaft portion 28 and a plurality of openings 35 which may be four in number and arranged at ninety degrees from each other for the reception of suitable screws 36 that extend through aligned openings 37 in the cap member 22 and aligned openings 38 in the head 14. The screws 36 are adapted to make threaded connection with the head 14 by means of internal threads in the openings 38. With reference primarily to Fig. 4, it is to be noted that the openings 38 are preferrably eight in number so as to permit angular rotation and establishment of the cap member 22 at various angles relative to the shaft 27 for a purpose and in a manner to be hereinafter more fully described.

The cap member 22 has an extension 39 formed radially outwardly therefrom. The extension 39 is adapted to support a saw guide member 40 as by suitable screws 41 which are disposed in the slots 42 in the saw guide 40 and threadably secured in threaded openings 43 in the extension 39. It may be seen that an additional pair of threaded openings 44 are provided in the extension 39 so as to permit adjustable positioning of the saw guide 40 radially inwardly or outwardly from the axis of the shaft 27.

The saw guide 40 has a radially extending slot 45 adjacent the end thereof closest to the cap member 22, this slot 45 being adapted for reception of a guide member 46 that is disposed outwardly from the axial surface of the extension 39. The guide member 46 prevents any misalignment of the saw guide 40 when the screws 41 are loosened. As shown primarily in Figs. 2, 8 and 9, the saw guide 40 comprises a central member 47 and a pair of side members 48, the side members 48 extending beyond the periphery of the central member 47, thus to define a peripheral groove 49. The various portions of the saw guide 40 are secured together as by a plurality of rivets 50 or the like. As shown primarily in Figs. 1 and 2, an endless chain type saw, indicated generally at 51, is adapted for reception about the sprocket 29 and the saw guide 40. The chain saw 51 is of the usual construction having a plurality of links 52 on which teeth 53 are formed. Some of the links 52 are provided with inwardly directed tabs 54 that are adapted to be received intermediate the teeth 55 of the sprocket 29, thereby to drive the chain about the saw guide 40 with cutting being accomplished adjacent the lower side thereof as indicated by the arrow 56.

It may thus be seen that the chain saw 51 will be driven by the sprocket 29 and about the saw guide 40 when the stub shaft 27 is rotated. The peripheral groove 49 formed in the saw guide 40 is positioned in radial alignment with the sprocket 29 in order to reduce all possibilities of binding of the chain saw 51 in the process of cutting. It is to be further noted that the screws 41 may be loosened and the saw guide 40 may be moved radially inwardly or outwardly about the guide member 46 in order to establish the proper tension on the chain saw 51.

With reference now primarily to Figs. 1 and 10, the tubular handle 13 is adapted for reception axially therein of a tubular driving shaft 57. The driving shaft 57 is adapted to extend throughout the length of the tubular handle 13 and be rotatably supported by suitable ball bearings 58 and 59 arranged respectively at opposite ends of the tubular handle 13, the bearing 58 being disposed directly in the handle 13 and the bearing 59 being disposed in a bore 60 formed in the outer end of the boss 16 of the head 14. The driving shaft 57 extends through the bearing 59 and into the chamber 15 formed within the head 14, as at 61. The end portion 61 is adapted to receive a bevel gear 62 that is supported thereon and fixed to the driving shaft 57 as by a suitable pin 63. The bevel gear 62 is adapted to mate with a similar bevel gear 64 that is secured on the stub shaft 27 as by a suitable pin 65. It may thus be seen that upon rotation of the driving shaft 57, through the gears 62 and 64, the stub shaft 27 will be rotated and in the manner hereinbefore described, will serve to rotate the sprocket 29 and the chain saw 51. In order to eliminate the possibilities of whipping of the driving shaft 57 when such shaft is rotated within the handle 13, a bushing 66 is disposed in the handle 13 at approximately the central area of the driving shaft 57. This bushing may be of rubber or the like and secured in place by any suitable means such as by an adhesive or similar bonding material.

With reference primarily to Figs. 1 and 10, the lower end of the handle 13 is secured to a substantially cylindrical fitting 67. The fitting 67 has a reduced diameter portion 68 that is adapted for reception in the end of the tubular handle 13, the handle 13 being secured thereto as by a pin 69. The driving shaft 57 is adapted to extend to a bushing 70 in the reduced diameter portion of the fitting 67 and slightly therebeyond. A driving fitting 71 is secured to the lower end of the driving shaft 57 as by a pin 72, this driving fitting having a square protruding end portion 73 that is adapted for reception in a square socket 74 formed on the end of a shaft 75. The shaft 75 is adapted to be driven by any suitable means such as, for example, the driving means 12 that has been shown and illustrated as being an air motor. It is to be understood in this connection that the driving means 12 may take a variety of forms such as, for example, an electric motor or a remotely driven cable from some other power source. In the particular form of the invention shown, the driving means 12 has a threaded end portion 76 that is adapted to be received in an open end 77 of the fitting 67 thereby to maintain the socket 74 in contact with the end portion 73 of the driving fitting 71. In the example given in the Figs. 1 and 10 and with reference primarily to Fig. 1, the driving means 12 may have a suitable operating lever 78 for the valve therefor and may be connected to a suitable source of compressed air or the like, by means of a flexible tube or conduit 79.

As may be desired to suit the operating requirements of the user of the present tree trimming mechanism, the cap member 22 may be disposed at various angles relative to the head 14 and about the axis of the stub shaft 27 by removing the screws 36 and rotating the cap member to align the openings 37 with any of the various openings 38 formed in the end of the head 14. In this manner, it may be seen that the chain saw 51 may be disposed in axial alignment with the handle 13 or may be rotated either right or left from this axis. Inasmuch as cutting takes place with the present chain saw traveling in the direction indicated by the arrow 56, it is to be specifically noted that the chain saw is on the leftward side of the handle when in the position shown in Figs. 1 and 2, so as to enable use by a right-handed person in the trimming of branches or the like from trees, brush or shrubbery.

From the foregoing description, the uses, and advantages and operation of the present invention will be readily understood by those skilled in the art to which the invention appertains. While there has been described a certain embodiment of the invention, it is again desired to emphasize the fact that the invention may be applied to various types of saw mechanisms and tree trimming devices, to have it understood that the examples given are merely illustrative, and that the invention is not to be limited to the details disclosed herein but is to be accorded the full scope of the appended claims.

I claim:
1. A tree trimming saw mechanism comprising, in combination: a supporting head; a cap member disposed for pivotal movement on one end of said head, a stub shaft; bearing means carried by another end of said head and by said cap member, said stub shaft being adapted to be rotatably supported in said bearing means and further adapted to extend outwardly beyond said one end of said head; a shrouded sprocket secured to the outer end of said stub shaft; a saw guide adjustably secured to said cap member and disposed in radial alignment with said sprocket; a chain saw disposed about said sprocket and said saw guide; means for retaining said cap member and said saw guide to said head at various adjustable angular positions about the axis of said stub shaft and said head; an elongated tubular handle member secured to said head and disposed normal to said stub shaft; a driving shaft disposed axially within said handle member; bearing means in said handle member for rotatably supporting said driving shaft, said driving shaft extending to said head; a pair of mating bevel gears arranged in said head and secured to said driving and stub shafts whereby, upon rotation of said driving shaft, to rotate said stub shaft, said sprocket and said chain saw; and means for rotating said driving shaft.

2. A tree trimming saw mechanism comprising, in combination: a supporting head; a cap member disposed for pivotal movement on one end of said head; a stub shaft; bearing means carried by another end of said head and by said cap member, said stub shaft being adapted to be rotatably supported in said bearing means and further adapted to extend outwardly beyond said one end of said head; a shrouded sprocket secured to the outer end of said stub shaft; a saw guide adjustably secured to said cap member and disposed in radial alignment with said sprocket; a chain saw disposed about said sprocket and said saw guide; a retainer plate disposed between said sprocket and said head; means associated with said retainer plate for retaining said cap member and said saw guide to said head at various adjustable angular positions about the axis of said stub shaft and said head; an elongated tubular handle member secured to said head and disposed normal to said stub shaft; a tubular driving shaft disposed axially within said handle member; bearing means in said handle member for rotatably supporting said driving shaft, said driving shaft extending to said head; a pair of mating bevel gears arranged in said head and secured to said driving and stub shafts whereby, upon rotation of said driving shaft, to rotate said stub shaft, said sprocket and said chain saw; and means for rotating said driving shaft.

3. A tree trimming saw mechanism comprising, in combination: a supporting head; a cap member disposed for pivotal movement on one end of said head; a stub shaft; bearing means carried by another end of said head and by said cap member, said stub shaft being adapted to be rotatably supported in said bearing means and further adapted to extend outwardly beyond said one end of said head; a shrouded sprocket secured to the outer end of said stub shaft; a saw guide adjustably secured to said cap member and disposed in radial alignment with said sprocket, said saw guide having a peripheral groove thereabout; a guide member carried by said cap member for guiding said saw guide in movement radially outwardly from said sprocket; a chain saw disposed about said sprocket and said saw guide; means for retaining said cap member and said saw guide to said head at various adjustable angular positions about the axis of said stub shaft and said head; an elongated tubular handle member secured to said head and disposed normal to said stub shaft; a tubular driving shaft disposed axially within said handle member; bearing means in said handle member for rotatably supporting opposite ends of said driving shaft, said driving shaft extending to said head; a bushing in said handle member adjacent a central portion of said driving shaft and preventing any whipping action of said shaft; a pair of mating bevel gears arranged in said head and secured to said driving and stub shafts whereby, upon rotation of said driving shaft, to rotate said stub shaft, said sprocket and said chain saw; and means for rotating said driving shaft.

4. A tree trimming saw mechanism comprising, in combination: a supporting head; a cap member disposed for pivotal movement on one end of said head; a stub shaft; bearing means carried by another end of said head and by said cap member, said stub shaft being adapted to be rotatably supported in said bearing means and further adapted to extend outwardly beyond said one end of said head; a shrouded sprocket secured to the outer end of said stub shaft; an extension disposed radially outwardly from said cap member; a saw guide adjustably secured to said extension from said cap member and disposed in radial alignment with said sprocket; a radial guide carried by said extension and adapted for cooperation with said saw guide; a chain saw disposed about said sprocket and said saw guide; a retainer plate disposed between said sprocket and said head; means associated with said retainer plate for retaining said cap member and said saw guide to said head at various adjustable angular positions about the axis of said stub shaft and said head; an elongated tubular handle member secured to said head and disposed normal to said stub shaft; a tubular driving shaft disposed axially within said handle member; bearing means in said handle member for rotatably supporting said driving shaft, said driving shaft extending to said head; a pair of mating bevel gears arranged in said head and secured to said driving and stub shafts whereby, upon rotation of said driving shaft, to rotate said stub shaft, said sprocket and said chain saw; and means for rotating said driving shaft.

5. A tree trimming saw mechanism comprising, in combination: a supporting head; a cap member disposed for pivotal movement on one end of said head; a stub shaft; bearing means carried by another end of said head and by said cap member, said stub shaft being adapted to be rotatably supported in said bearing means and further adapted to extend outwardly beyond said one end of said head; a shrouded sprocket secured to the outer end of said stub shaft; an extension disposed radially outwardly from said cap member; a saw guide adjustably secured to said extension from said cap member and disposed in radial alignment with said sprocket; a radial guide carried by said extension and adapted for cooperation with said saw guide; a chain saw disposed about said sprocket and said saw guide; a retainer plate disposed between said sprocket and said head; means associated with said retainer plate for retaining said cap member and said saw guide to said head at various adjustable angular positions about the axis of said stub shaft and said head; an elongated tubular handle member secured to said head and disposed normal to said stub shaft; a tubular driving shaft disposed axially within said handle member; bearing means in said handle member for rotatably supporting opposite ends of said driving shaft, said driving shaft extending to said head; a bushing in said handle member adjacent a central portion of said driving shaft for guiding said shaft and preventing any whipping action of said shaft; a pair of mating bevel gears arranged in said head and secured to said driving and stub shafts whereby, upon rotation of said driving shaft, to rotate said stub shaft, said sprocket and said chain saw; and means for rotating said driving shaft.

6. A tree trimming saw mechanism comprising, in combination: a supporting head; a cap member disposed for pivotal movement on one end of said head; a stub shaft; bearing means carried by another end of said head and by said cap member, said stub shaft being adapted to be rotatably supported in said bearing means and further adapted to extend outwardly beyond said one end of said head; a shrouded sprocket secured to the outer end of said stub shaft; a saw guide adjustably secured to said cap member and disposed in radial alignment with said sprocket; a chain saw disposed about said sprocket and said saw guide; means for retaining said cap member and said saw guide to said head at various adjustable angular positions about the axis of said stub shaft and said head; an elongated tubular handle member secured to said head and disposed normal to said stub shaft; a tubular driving shaft disposed axially within said handle member; bearing means in said handle member for rotatably supporting said driving shaft, said driving shaft extending to said head; a pair of mating bevel gears arranged in said head and secured to said driving and stub shafts whereby, upon rotation of said driving shaft, to rotate said stub shaft, said sprocket and said chain saw; driving means for rotating said driving shaft; means for securing said driving means to said tubular handle member; and means for removably connecting a rotating portion of said driving means to said tubular driving shaft.

7. A tree trimming saw mechanism comprising, in combination: a supporting head; a cap member disposed for pivotal movement on one end of said head; a stub shaft; bearing means carried by another end of said head and by said cap member, said stub shaft being adapted to be rotatably supported in said bearing means and further adapted to extend outwardly beyond said one end of said head; a shrouded sprocket secured to the outer end of said stub shaft; an extension disposed radially outwardly from said cap member; a saw guide adjustably secured to said extension from said cap member and disposed in radial alignment with said sprocket; a radial guide carried by said extension and adapted for cooperation with said saw guide; means associated with said retainer plate for retaining said cap member and said saw guide to said head at various adjustable angular positions about the axis of said stub shaft and said head; an elongated tubular handle member secured to said head and disposed normal to said stub shaft; a tubular driving shaft disposed axially within said handle member; bearing means in said handle member for rotatably supporting opposite ends of said driving shaft, said driving shaft extending to said head; a bushing in said handle member adjacent a central portion of said driving shaft for guiding said shaft and preventing any whipping action of said shaft; a pair of mating bevel gears arranged in said head and secured to said driving and stub shafts whereby, upon rotation of said driving shaft, to rotate said stub shaft, said sprocket and said chain saw; driving means for rotating said driving shaft; means for securing said driving means to said tubular handle member; and means for removably connecting a rotating portion of said driving means to said tubular driving shaft.

References Cited in the file of this patent
UNITED STATES PATENTS

| | | |
|---|---|---|
| 1,382,350 | Gleason | June 21, 1921 |
| 1,520,330 | Chinn | Dec. 23, 1924 |
| 1,557,238 | Boerner | Oct. 13, 1925 |
| 1,763,730 | Von Lackum | June 17, 1930 |
| 2,291,470 | Hope | July 28, 1942 |